United States Patent [19]
Parra

[11] Patent Number: 5,168,473
[45] Date of Patent: Dec. 1, 1992

[54] INTEGRATED PASSIVE ACOUSTIC AND ACTIVE MARINE AQUATIC APPARATUS AND METHOD

[76] Inventor: Jorge M. Parra, 7332 Grand Blvd., New Port Richey, Fla. 34652

[21] Appl. No.: 744,505

[22] Filed: Aug. 14, 1991

Related U.S. Application Data

[63] Continuation-in-part of Ser. No. 545,954, Jul. 2, 1990, Pat. No. 5,099,455.

[51] Int. Cl.[5] .............................................. G01S 15/96
[52] U.S. Cl. ................................... 367/124; 367/118; 367/99
[58] Field of Search .......................... 367/118, 124, 99

[56] References Cited

U.S. PATENT DOCUMENTS 3,870,988  3/1975  Turner .................................. 367/99

Primary Examiner—Daniel T. Pihulic
Attorney, Agent, or Firm—Jim Zegeer

[57] ABSTRACT

One or more passive transducers for converting sounds, including bio-soundwaves from a living aquatic animal source traveling in a body of water, to electrical signals, is combined with an active sonar (echo sounding) to form an integrated marine acoustic system. Moreover, a common display can be used and coupled with a satellite (GPS) or loran position locator so that a fishing vessel carrying the apparatus can have its position displayed on an electronically reproduced chart or map of an area along with the fish location, including an indication of the direction of fish movement, and fish species.

7 Claims, 7 Drawing Sheets

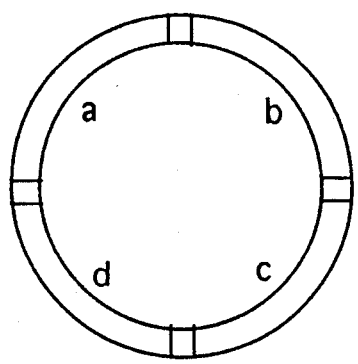
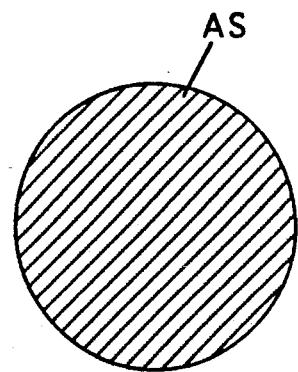
FIG. 5a  FIG. 5b
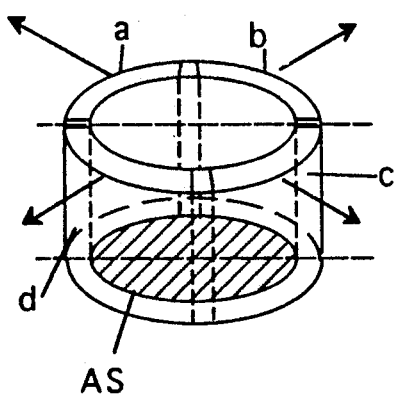
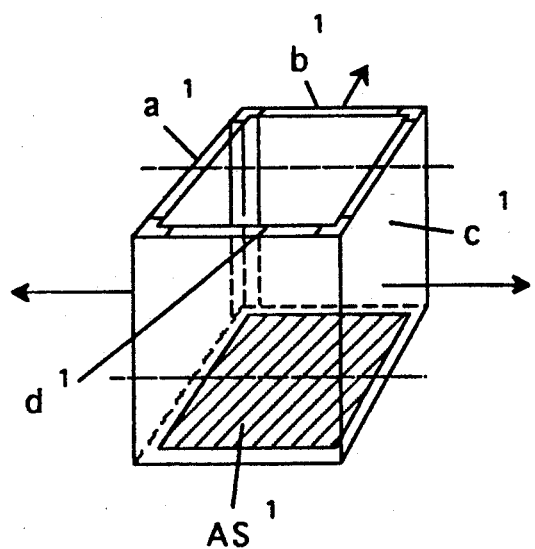
FIG. 5c  FIG. 5d

DR=DEPTH OF RTA
PS=DIRECT PATH SIGNAL
BS=BOTTOM SURFACE SIGNAL
B=BOTTOM SIGNAL
SB=SURFACE BOTTOM SIGNAL

RANGE=TIME DIFFERENCE OF
$(T_B - T_{BS}) \times 4800$ FT/SEC

DEPTH=TIME DIFFERENCE OF
$(T_B - T_{SB}) \times 4800$ FT/SEC

INTEGRATED PASSIVE ACOUSTIC AND ACTIVE MARINE AQUATIC APPARATUS AND METHOD

REFERENCE TO RELATED APPLICATIONS

This application is a continuation-in-part of application Ser. No. 07/545,954 now U.S. Pat. No. 5,099,455 entitled "PASSIVE ACOUSTIC AQUATIC ANIMAL FINDER APPARATUS AND METHOD" filed Jul. 2, 1990, which is incorporated herein by reference.

THE PRESENT INVENTION

In my above-referenced application I disclose an improved low-cost passive acoustic animal detector and method which provides an indication of the presence of the aquatic animal, the direction or orientation thereof relative to the transducer, and range, as well as an indication of the type fish that is present. The operation of the passive acoustic aquatic animal detector is that the acoustic sounds are received by the passive transducer and the acoustic energy is converted to electrical energy which is then amplified and fed into a filter and phase locked loop discriminator section where the signal is bandpass filtered to remove unwanted background noise and man made interference noise and pass the desired bio-sound signals. The configuration of filters are in a cascaded high-pass/low-pass configuration to maximize attenuation outside the desired frequency. The phase locked loop is adjustable or programmed to pass a predetermined discrete pattern of electrical signals constituting a sonic profile, signature or imprint of a selected aquatic animal.

According to the present invention, an active sonar system is integrated with the passive system of my above application. According to a preferred embodiment of the invention, a marine transducer is used to transmit and receive echoes of acoustic impulses and ranging circuits determines acoustic travel time (or range) to a target, usually the bottom of the body of water and develop a profile of the bottom topography.

When a single passive transducer is used, it is rotatable or orientable about an axis and by noting when the maximum amplitude signal is received, and the orientation of the transducer, the direction to the particular fish is indicated. An active transducer is used to measure the depth of the water below the transducers and produce a bottom surface profile.

In a further embodiment, a plurality of passive transducers are spacedly mounted in array about an axis and the passive transducers are each sampled via a preamplifier which has its outputs connected to a series of analog gates, the analog gates being selectively activated so as to pass or sample, in any sequence desired, any signals received by the transducers. In this embodiment the active sonar transducer has its acoustic axis substantially normal with the scanning axis of the passive transducer so the passive transducers look to the sides of the location and the active transducer looks down.

The circuitry initially operates as a multiplexer with respect to each of the segments of the passive transducers and in effect, a scanning action can be obtained through any quadrant, group of quadrants or all of the quadrants and this is preferably be controlled by a microprocessor. Since the frequencies for the biosound transducers are much lower than those used for active transducers, it is preferred that separate transducers and front-end signal processors be used. However, a single transducer may be multiplexed for use to perform passive and active transducer functions when these frequency aspects are taken into account.

The multiplexed passive transducer signals are amplified, applied to one or more bandpass filters and discriminators for indicating the presence of the fish, the species and for driving a display driver for indicating the distance to the fish as well as the direction. In this embodiment, the multiplexed signal is digitized in an analog-to-digital converter circuit supplied to a microprocessor which controls a voltage controlled oscillator and a counter circuit so that the maximum signal received by any one or two (or more) passive transducer segments can be utilized to indicate a precise direction to the a particular aquatic animal. The filter and discriminator functions as well as the range (passive and active sonar) determining function can be performed by a microprocessor. In this case, a library of aquatic animal sounds, signature or imprints for different fish and mammal species can be stored in a read-only memory, accessed by the microprocessor to determine the particular type fish sounds and mammal being received. The particular fish and/or mammal and direction thereof can be stored in a local memory (RAM) and presented to the user on a display (typically a small low cost dot matrix display liquid crystal display (LCD), plasma, or electroluminescent (EL)) indicating the type fish or aquatic animal in each direction, the range thereof and thus permit the fisherman to select which particular fish species of fish to go after and fish or mammals to avoid. The display can also provide the active sonar range information to the user. When the active transducer is oriented coaxial with scanning axis, depth information and bottom topography can be displayed.

In a further embodiment, one or more active transducers oriented in the direction of the passive transducer to provide range measurements to fish, whose species have been identified by the passive system, or the passive and active transducer outputs can be used to validate each other. Thus, when an active sonar provides an echo indication of a fish, the passive transducer output can be used to verify the return as a live aquatic animal in the direction of the echo return and the species thereof.

DESCRIPTION OF THE DRAWINGS

The above and other objects, advantages and features of the invention will become more apparent when considered with the following specification and accompanying drawings wherein:

FIGS. 5a, 5b, 5c and 5d are embodiments of transducer assemblies according to the invention.

DETAILED DESCRIPTION OF THE INVENTION

Figure 1:
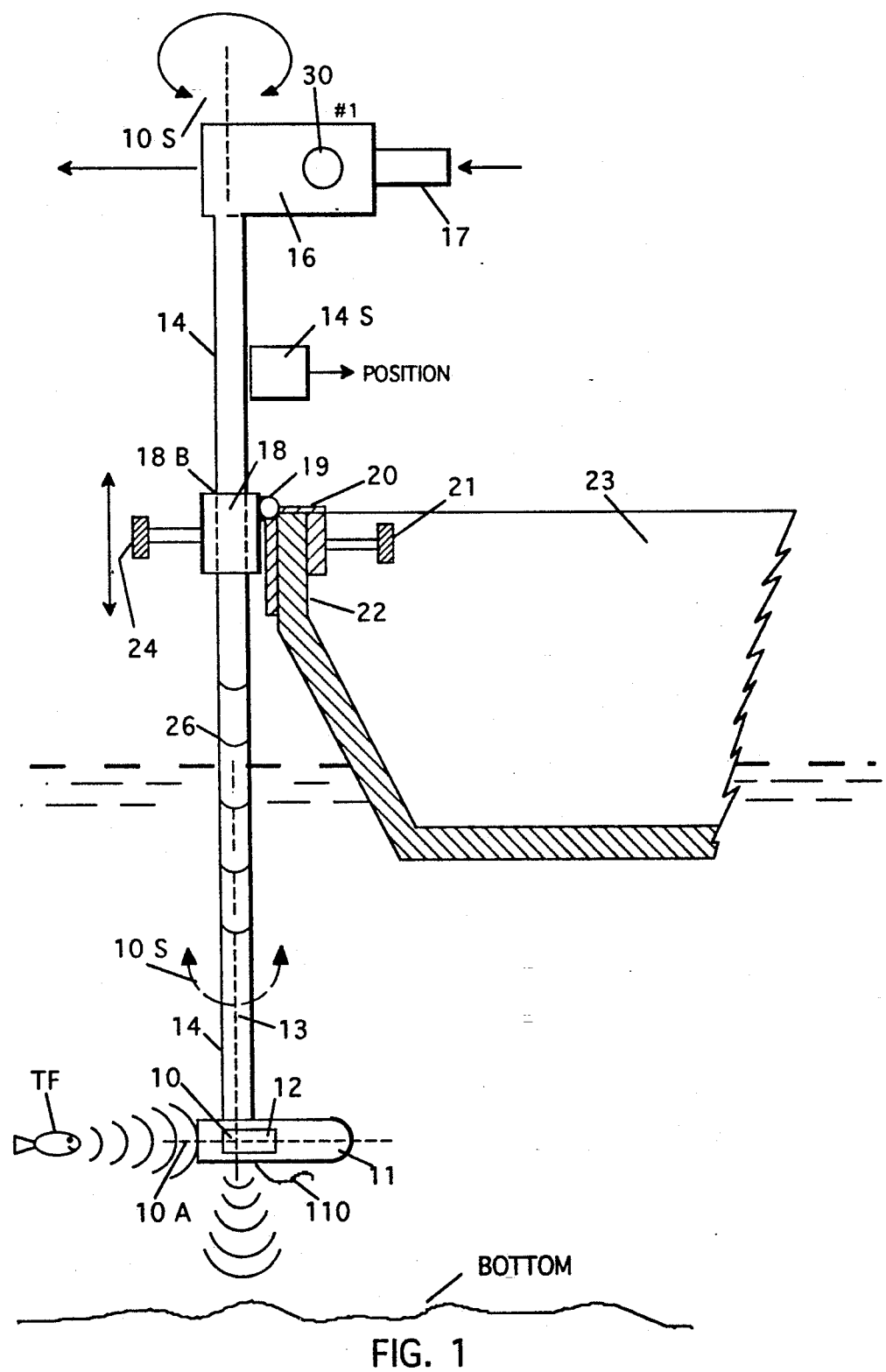
FIG. 1 is a diagrammatic illustration of a simplified embodiment of the invention.

Referring now to FIGS. 1 and 1, acoustic transducer 10 is a marine-type microphone or a hydrophone mounted below the water surface in a housing 11 which also contains a preamplifier 12 and an amplified signal is carried through coax cable 13 which passes through hollow control shaft 14 to a housing 16 which has a control handle 17 thereon. Passive transducer 10 has an aiming axis 10A and a scanning or rotation axis 10S. In this embodiment, an active sonar transducer 110 has its acoustic axis vertical so that its emitted ultrasonic pressure waves travel downwardly and echo pulses are received from the bottom and objects located below the transducer 110. There may be a plurality of active transducers or transducer segment which are multiplexed to scan the bottom.

A mounting bracket 18 is pivotally secured by a pivot 19 to a transom bracket 20 which has a locking set screw or clamp 21 which secures the bracket to the transom or gunwale of a boat 23. Bracket 18 has a bearing 18B therein to rotatably support control post 14. Control post 14 is slidable in bearing 18b and a clamp screw 24 clamps it in an adjusted depth position in the water. The different depths of the transducer 10 in the water is indicated by indicia 26 on hollow control shaft 14. The bracket 18 allows 0-360 degree swiveling or rotation of post 14 therein about scanning axis 10S very much in the manner of conventional outboard electric motors. The annular position of shaft 14 can be detected by servo 14S for controlling the angular orientation of the bar display 31.

Figure 2:
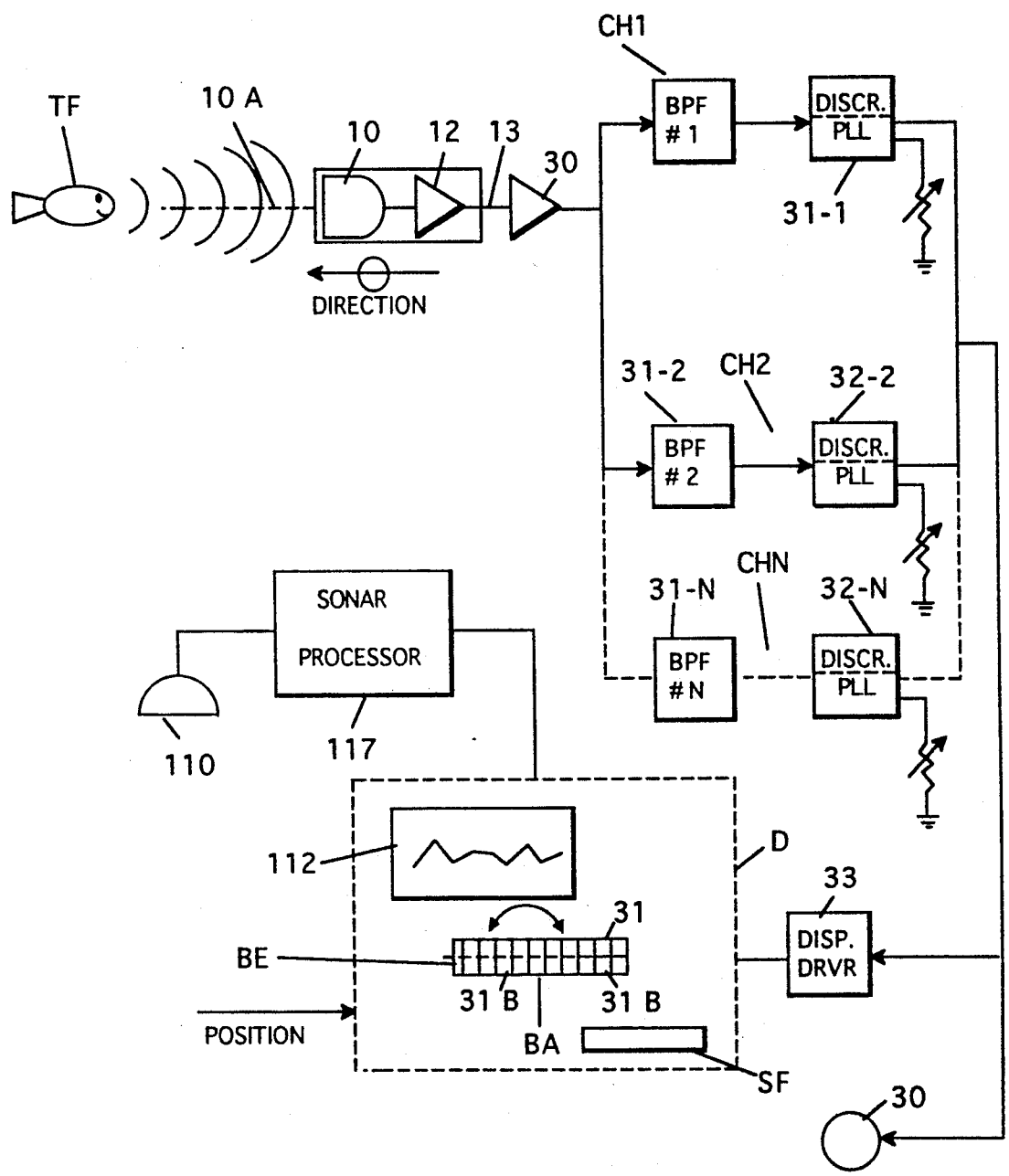
FIG. 2 is a schematic block diagram of the passive acoustic fisher finder or detector incorporating an active sonar system.

Thus, the passive transducer 10 and control box 16 are rotatable through 0-360 degree so that when the transducer 10 is positioned below the bottom of the boat 23, it can search in all directions of the compass and in this manual search mode, two indicia are provided to the user, namely, an audible sound from a piezo-sounder 30 and a display on a bar display 31 (FIG. 2). Transducer 10 can be tilted about the axis of pivot 19 and clamped in that position so that the axis 10A of transducer 10 is aimed slightly downward or upward. Although not shown, transducer 10 can be pivotally mounted on a universal joint at the lower end of control post 14 and its angular relationship to control post 14 separately adjusted. Active transducer 110 is used for depth finding or ranging purposes in these various orientations of the passive transducer 10.

As will be described more fully hereinafter, when a selected fish sound is detected, a piezo-sounder is electrically energized (preferably after a set threshold or squelch level) to indicate the presence of a fish F in a direction in which the transducer axis 10A is oriented or pointing. By orienting the transducer 10 until the sound is the loudest, the transducer is pointed precisely in the direction of the fish and, as shown in FIG. 2, a symbolic electronic bar indicator 31 in integrated display D is electronically rotated about its axis BA so that end DE points in the direction of the aquatic animal, its species is indicated in a species field SF and length of the bar or number of segments illuminated indicates the strength or amplitude which is a measure of the range to the fish. (In the embodiment shown in FIG. 3, echo range measurements are made on the target fish as will be described later herein.)

By slowly scanning the transducer 10 by the rotation of handle 17 about the axis of post 14, the sound will peak when the transducer is pointed directly at the fish and the maximum length or number of bars of indicator 31 will be illuminated or lit providing an indication of the range to the target fish. It will be appreciated that various ways of causing the light to "flash" or go on and off in a sequence may be incorporated in the invention. For example, a peak amplitude detector may be incorporated to cause the light bars to illuminate only within a predetermined number of scan degrees to each side of the maximum amplitude.

As shown, transducer 10 and preamplifier 12 are connected by a coaxial cable 13 to a further amplifier 30 which, in turn, provides amplified biosound signals as well as all other signals such as boats and the like to bandpass filters 31-1, 31-2 . . . 31-N. Filters 31 are connected to receive the electrical signals from the transducer 10 and eliminate therefrom all man-made and similar signals of a periodic character and to pass the biosound electrical signals from, for example, the target aquatic animal or fish TF. For example, one band pass filter can be set to have a pass band of 25-250 Hz and the other a pass band of 250-1 kHz and another pass band of 1-2 kHz, etc. Obviously the pass band frequencies can vary and be adjusted to pass wider or narrower bands and reject or provide a high impedance to frequencies outside the selected bands.

Discriminators 32-1, 32-2, 32-N are connected to receive the outputs of bandpass filters 31-1, 31-2 . . . 31-N, respectively, and each probe discriminator includes a phase lock loop PLL which is programmed to pass a predetermined pattern of biosound wave electrical signals constitute a sonic profile imprints or signature of a selected fish or species. That is, the discriminator is programmed by adjustment resistors 32R-1 . . . 32R-N to detect a desired pattern of bio-sounds. For example, the discriminators can be programmed to detect sounds correlated to a general family of aquatic animals such as bass, trout, snapper, grouper, dolphin, porpoises, whales (mammals) or shrimp, crabs, sea urchin, octopus, etc., each species of which has its own unique and discrete biosound signature or imprint.

The kinds of fish are detected by the discriminators which, as indicated above, each are programmed in this embodiment to detect sounds unique of a selected species of fish. A solid-state discriminator unit which has been found useful for this purpose is designated as LM567 by National Semiconductor, but obviously the invention is not limited thereto. This function can be performed in a microprocessor. In one embodiment the bandpass filters were set as follows:
Frequency band for BPF31-1:25-250 Hz
Frequency band for BPF31-2:250-2500 Hz
Frequency for most marine mammals for BPFN 1000-5000 Hz Obviously the pass band filters can be set quite differently than the above.

In FIG. 2, bio-sounds signals are supplied to piezo sounder 130 which converts the electrical biosound signals passed by bandpass filters 31 and discriminators 32 to an audible sound at an intensity corresponding in amplitude to the strength of the signal received by the transducer 10 and, accordingly, the amplitude corresponding generally to the range R to target fish TF.

The discriminators will detect both periodic and nonperiodic bio-sounds. The band pass filters reduce the bands for the discriminators. This provides rejection of entire bands which may be of no interest at a given time.

Each discriminator, in the preferred embodiment, use a phase lock loop (PLL) which will lock onto a precise frequency. More than one discriminator can be used if multiple frequencies are of interest at the same time. When such a frequency is detected by the PLL circuit, an indication signal thereof is provided to drive a visual D or aural 130 indicator directly or to a microprocessor. The lock-on time may be appreciably less than one (1) second at low frequencies and less than one-thousands of a second (1 ms) at higher frequencies. This fast lock-on time is preferable as some bio-sounds which it is desired to detect are of a periodic nature. The width of the pass band of the discriminator (e.g. range of frequencies that the discriminator will detect) is adjustable up to a given percent of the center frequency, if the percent is 14% (i.e., $0.14 \times 500-70$ Hz pass band of 465-535 Hz). These signals are supplied to display driver 33 for driving display D and indicator 31. Range indicator 31 is rotated about axis BA so that end BE points in the direction of the biosound source, and the number of bars 31A, 31B, illuminated is a measure of range which can be scaled (e.g. X1, X5, X10). Each channel CH1, CH2 ... CHN is programmed to be fish specific and provide an indication thereof in specific fish field SF in the display D.

The active transducer 110 signal processor circuit 111 incorporates conventional driver and transmit and receive networks to alternatively transmit and receive ultrasonic pulses in water, start a timer on emission of a pulse or "ping" and stop the timer on detection of an echo as a measure (time/2) of range to a target. The echo pulses may define the bottom topography and be illustrated on an LCD display 112 in association with fish detection on range 31 of Display D.

Figure 3:
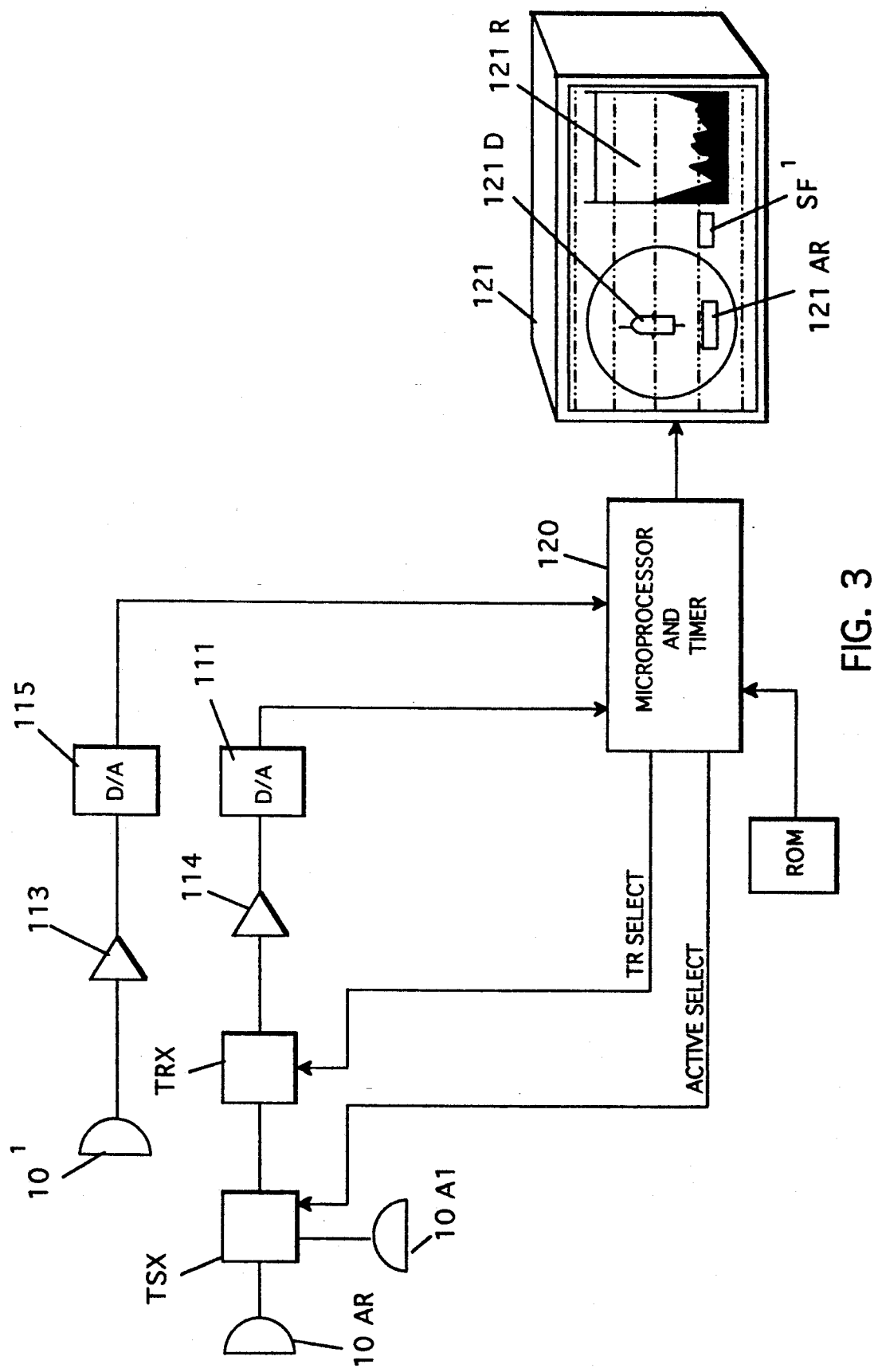
FIG. 3 is a schematic block diagram of a further embodiment of the invention.

In FIG. 3, the acoustic axis active 10 A1 and passive 10' transducers are oriented normal to each other whereas the axis of active transducer 10 A2 is substantially parallel thereto. Signals from both passive and active transducers are preamplified in 113 and 114, converted to digital in A/0 converters 115, 116 and supplied to microprocessor 120. In the embodiment shown in FIG. 3, there may be two or more active transducers 10A1, 10A2, which are selectively activated, by transducer select switch TSX to provide the usual depth measurements (transducer 10A1) and drive integrated display 121 to show bottom-top graph 121R and one or more oriented with the axis of the passive transducer to give an echo range measurements 121AR to any biosound source located by the passive transducers. The vessel indicator 121D is oriented with the axis of transducer 10' which is parallel with the axis of active transducer 10A2.

The microprocessor 120 uses digital signal processing (DSP) which provides the most accuracy in determining more precisely the family of fishes involved, or aquatic animal, producing the bio-sound and the microprocessor control of the various functions outputted to the operator via an LCD display 21. In this case display 121 has a directional indicator 121D for indicating direction to selected species to aquatic animals which have been detected by the passive transducer 10, species indicator SF', and an depth indicator 121R for showing bottom topography.

An adjustable level detector may be incorporated in the piezo-sounder or the display, or be provided at the outputs of the discriminators so as to provide a minimum or squelch level before there is any activation of those devices.

Active transducer selector switch TSX is controlled by microprocessor 120 to select downwardly oriented active depth transducer 10A1 or horizontally oriented active transducer 10A2 (the orientations referring to their acoustic axis.) Microprocessor 120 also controls switch network TRX to selectively drive a selected active transducer with a predetermined ultrasonic frequency or to allow received and transduced echo signals to pass from the selected active transducer to time measuring circuitry. In this case the time measuring circuit is contained in microprocessor 120 which receives the echo signals from D to A converter 116 and display the range in range field 121AR and the depth or bottom topography in display field 121R.

Figure 4:
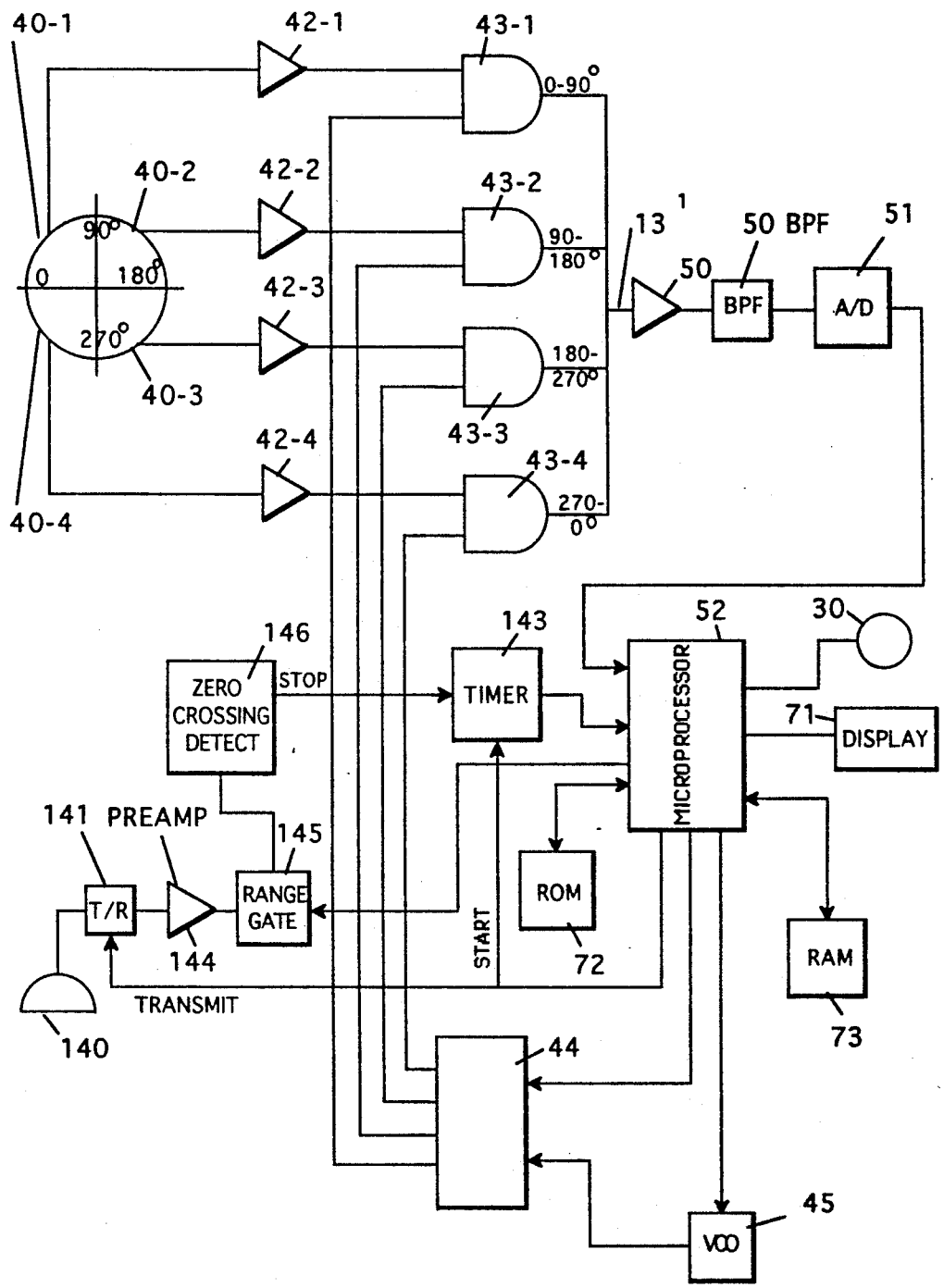
FIG. 4 is a block diagram of a further embodiment of the invention.

Instead of scanning for target aquatic animals TF by mechanical rotation of transducer 10, FIG. 4 illustrates electrical scanning wherein there is one transducer per quadrant making a total of four transducers, there can, of course, be more or less transducers as desired. See my above-referenced application. Each transducer 40-1, 40-2, 40-3 and 40-4 is connected to a preamplifier 42-1, 42-2, 42-3 and 42-4, respectively, whose outputs are supplied to a gate circuits 43-1, 43-2, 43-3 and 43-4, respectively, which receive as a second input enable or gate signals from a counter 44 which, in turn, receives inputs from control oscillator 45 controlled by microprocessor 52. The arrangement is such that the microprocessor controlled oscillator 45 supplies pulses to counter 44 which counts these pulses to produce outputs on terminals 44-1, 44-2, 44-3 and 44-4, one for each gate circuit 43-1 so that these pulses in effect cause the gates to sample the biosound signals picked up by each of the transducers 40-1, 40-2, 40-3 and 40-4. They thus appear on the outputs of gates 43-1, 43-2, 43-3 and 43-4 as the acoustic signals detected for the four quadrant segments 0 to 90 degrees, 90 to 180 degrees, 180 to 270 degrees, 270 degrees to 0 degrees. The time period for sampling e.g., the rate of the VCO operation 45 and the counter operation 44 can be adjusted, either speeded up or slowed down or stopped on one quadrant. A speed of 1 rpm (four sequential gate pulses from counter 44 in one minute), for example, results in each passive transducer segment sampling of about 15 seconds. A speed of ½ rpm results in passive transducer segment sampling of 7.5 seconds. Each of the signals issuing from the gate circuits 43-1, 43-2, 43-3 and 43-4, e.g., the multiplexed signals, are supplied by coaxial cable 13' to amplifier 50.

The multiplexed signals from amplifier 50 are bandpass filtered in filter 50BPF and are supplied to analog-to-digital converter 51 which supplies these signals to microprocessor 52 which serves as a controller for counter 44 and voltage controlled oscillator 45. Bandpass filter 50 BPF is similar to filter 31 in that it eliminates all periodic signals and passes only biosound signals. Microprocessor or controller 52 detects the maximum amplitude in each segment of transducer 40-1, 40-2, 40-3 and 40-4 and stores same in RAM memory 73 and causes counter 44 to terminate the scan to temporarily lock on those segments in which the maximum amplitude is being produced. For example, if the maximum amplitude of incoming biosound signals is between segments 40-3 and 40-4, indicating that there is aquatic animal activity in the area between 90 and 180 degrees (these angular directions are relative of course), the microprocessor 52 will cause counter 44 to lock on and provide gate signals alternately to gates 43-3 and 43-4. If the detected signals do not appear to be of interest, the processor 52 can resume the scanning operation.

Microprocessor 52 is programmed to perform the functions of discriminators 32-1 and 32-2 of FIG. 2.

Referring again to the counter 44, the gate pulses therefrom to the gates 43-1, 43-2, 43-3 and 43-4 in effect cause a scanning of the sensor segments or transducer segments 40-1, 40-2, 40-3 and 40-4 and, in a preferred embodiment, the scan rate is at about 1 rpm. As noted above, at this rate the gates will pass the transduced electric signals from the transducers 40 about every 15 seconds during the scan mode and then between one, two or three adjacent segments according to the output of the microprocessor 52. Thus, should the fish be in a location between bridging two transducer segments, and then moves to where it is basically centered on one segment, the microprocessor tracks this movement and provides an indication on the display N of the movement of the fish and the direction of the movement of the fish. For example, if the fish is swimming in a circle around the transducer, the output of the different transducers will detect the acoustic sounds transmitted by the fish as it swims activating each transducer in turn and providing a visual display of the swimming movement.

The active transducer 140 is downwardly oriented in this embodiment and is conventionally driven by a driver in transmit receive network 141, which, in turn, is controlled by microprocessor 52. When an ultrasonic pulse is transmitted by transducer 140 a "start" is applied to timer 143 which begins counting its internal clock pulses or clock pulses from microprocessor 52. After the transmission of an ultrasonic pulse in the water by transducer 140, TR switch network 141 is operated to pass transduced echo or return signals to a preamplifier 144. Microprocessor controller 152 operates conventional range gate 145 after a selected time after launching of a pinging or ranging ultrasonic pulse in the water in a known direction. A conventional AGC circuit (not shown), may also be incorporated in the active transducer circuits. The echo signal from range gate 145 is supplied to a zero crossing detector 146 which outputs a "stop" signal to timer 143. The time measurement is used to determine range with the speed of sound in water at a given temperature, silinity, etc. being calculated by microprocessor in a conventional fashion and displayed on display 71. In this case display 71 can be similar to display 121 in FIG. 3.

As discussed above, the transducer 40 has four segments 40-1, 40-2, 40-3 and 40-4 covering the 0 to 90 degree segment quadrant, 90 to 180 degree quadrant, 180 to 270 quadrant, and 270 to 0 degree quadrant. The signals from each of the quadrants are amplified in preamplifiers 41-1, 41-2, 41-3 and 41-4. While the multiplexing operation can be performed either at the transducer head or in the electronic's compartment, in this embodiment, the multiplexing operation is performed at the transducer head. So in this case, the gates 44-1, 44-2, 44-3 and 44-4 are located in the transducer head and receive gate signals from counter 44. The gated analog signals constituting the 0 to 90 degree, 90 to 180 degree, 180 to 270 degree ad 270 to 0 degree segments are coupled by a coaxial cable 131 to amplifier 50, bandpass filter 50BPF and analog-to-digital converter 51. The digital signals constituting the multiplexed output for the individual segments are then supplied to the microprocessor 52 which controls oscillator 45 and, in turn, the counter 44 in a manner similar to the control performed by microprocessor 120 in connection with the embodiment shown in FIG. 3.

In this case, the microprocessor 52 also operates the piezo-sounder 30 and the display 71.

In addition, a read-only memory 72 is provided for storing sonic profiles of large number of fish species which is used to compare with the incoming acoustic or sonic profiles so as to identify a specific fish species. At the same time, microprocessor 52 stores for short term use data in a random access memory 73 for making range calculations based on biosound signals received by the passive transducer to be described later. It is, of course, obvious, that the amplitudes of the sound are also used in this case to determine range. However, as will be described hereafter, range determinations may also be computed from times of arrival of acoustic energy from a given target aquatic animal. As discussed earlier, active sonar transducers can be used to perform the range measurements.

While in the preferred embodiment of the invention, a scanning action is performed, it will be appreciated that a separate channel can be provided for each transducer sector and each discriminator function sampled or multiplexed to display 72 which indicates the sector direction, range, depth and species of aquatic animal in the sector.

FIGS. 5a and 5b are top views of a five acoustic axis transducer assembly incorporating the invention wherein passive transducers a, b, c and d are in an outer ring of four PVF$^2$ (KYNAR ®) segments connected to the sequential scanner and display described above in connection with FIG. 4 and AS is an active transducer. FIG. 5c is an isometric view of these passive and active transducers in assembly. The four curved segments a, b, c and d have acoustic axes which are each in this embodiment, perpendicular to the vertical axis and the active transducer segment AS is on the bottom and has its acoustic axis aligned with the vertical axis. It will be appreciated that a plurality of further passive transducers with different acoustic axes some up, some down, may be used and in some cases, active transducers can be used for passive purposes and vice versa. In FIG. 5d, the passive transducers are planar (e.g., not curved).

The active sonar and the passive system may be used with logic circuit to complement each other. For example, active sonar fish finders frequently will receive a return echo from a submerged hollow log, dead fish or other submerged debris and will indicate finding fish. However, since the passive or present transducers gave an indication of a live aquatic animal, and if desired, the species, the indicator display, controlled by the logic (in microprocessor 52) of a combined active and passive transducer system will produce an indication display of fish. When the passive system is not operating, the active sonar will produce accurate range measurements for depth sounding and bottom features or topography. In any case of questionable "fish" return signals relative to finding live aquatic animals, it is preferred that the logic circuit causes the signals from the passive transducer system prevail over the active sonar, since the passive system with its bandpass filters and programmed discriminators will be responsive only to living animals or biosounds. Thus, even if the active sonar indicates presence of fish, unless the passive system indicates the presence of fish, there will be no positive indication of the presence of fish in a given direction from the host vessel.

It is desirable to be able to discriminate between fish species for example, grouper may be swimming with mullet or vice versa. The passive system detects both grouper and mullet in the received biosound waves and the microprocessor can discriminate between grouper and mullet and select a specific species of fish to be responsive to, even though there are other fish swimming in the area of the target fish. If the logic in the microprocessor for combining passive and active signals in this case does not receive a signal indicating for example, grouper, it will cause the system to ignore mullet. (Of course, mullet could be the target fish.)

As discussed in my application Ser. No. 07/545,954, the bandpass filters and discriminators can even be programmed for human cardiovascular sounds and/or human skeletal sounds so the system can locate swimmers and divers, as well as providing depth, range, location of biosound sources, and species.

Figure 8:
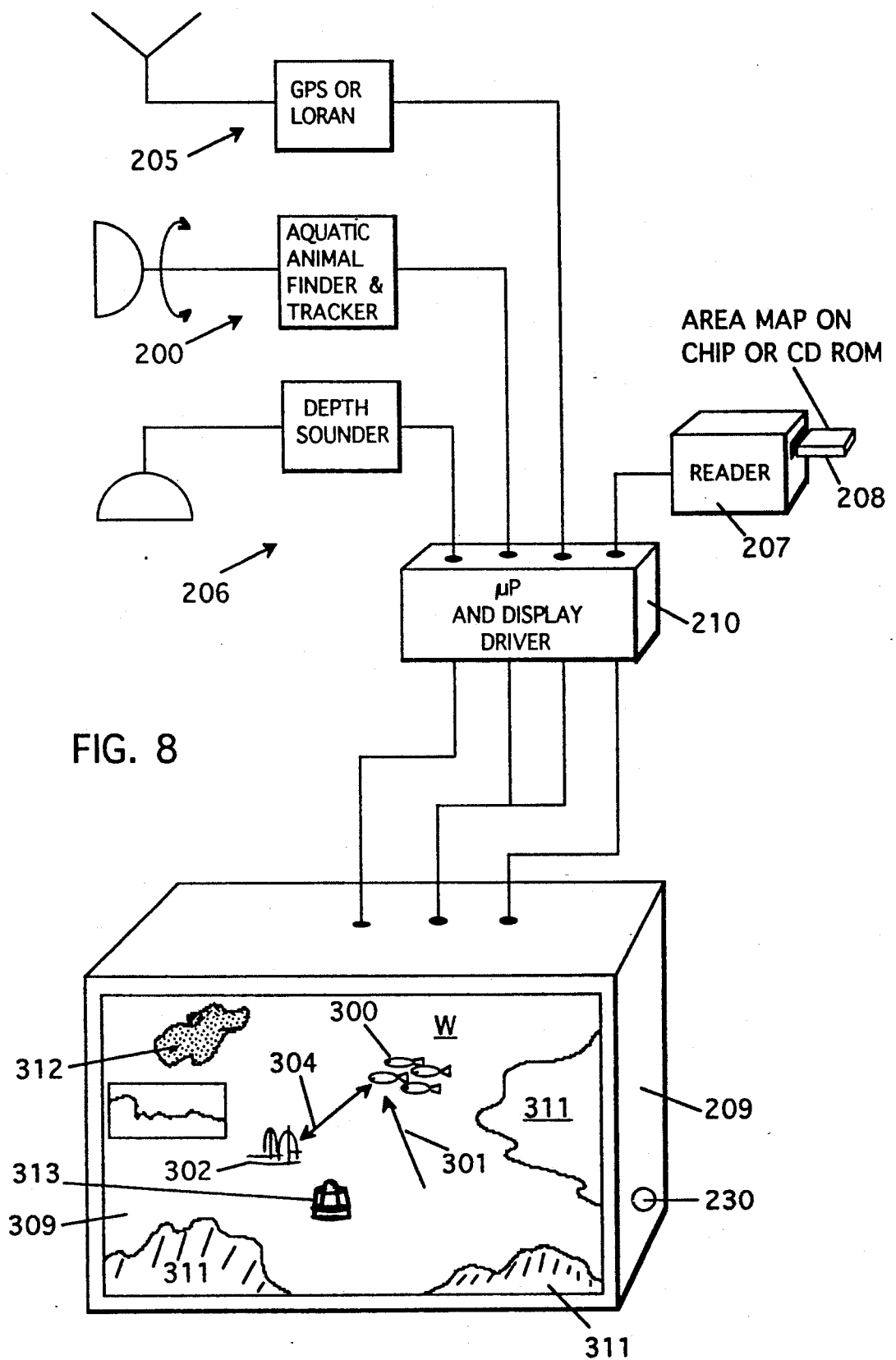
FIG. 8 is a pictorial block diagram of a further embodiment of the invention.

The display can be side-by-side on a common display as shown in FIG. 8 or an integrated display wherein the environment of a fish, such as bottom profile or topography, etc. will be included in the display with directional and range information. The rough range calculations feature of my above-referenced application can be compared with the accurate active sonar range measurements to develop data for studies of aquatic or marine life.

Figure 6:
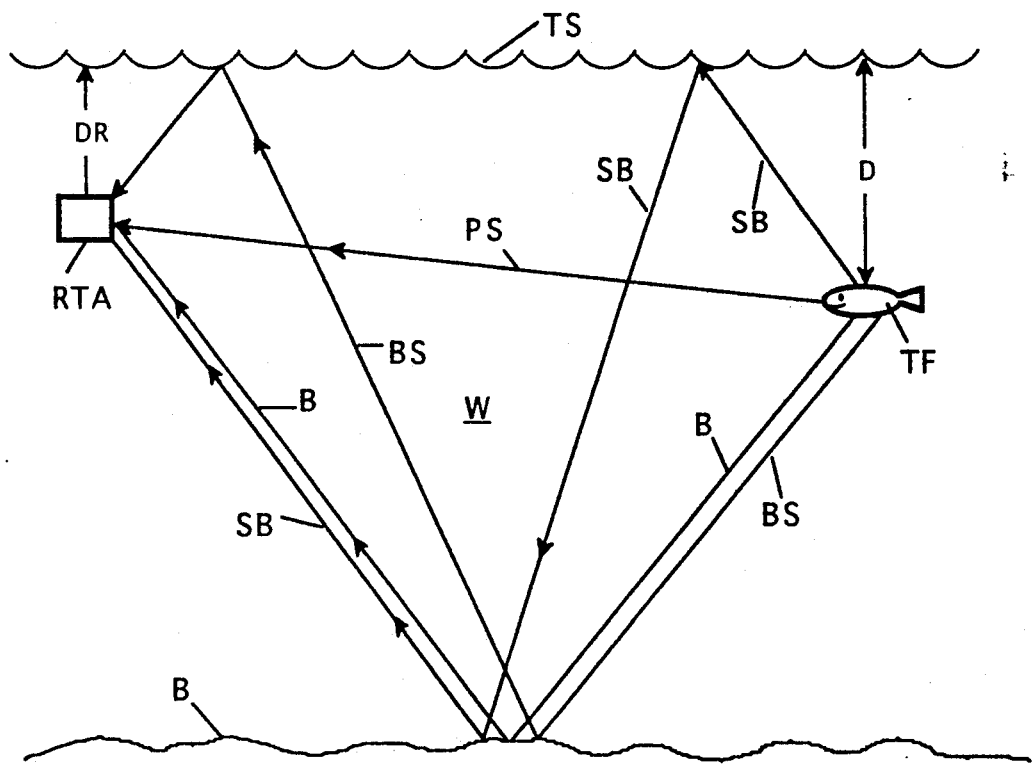
FIG. 6 is a diagram illustrating the acoustic sound path relationships of sound emanating from a target fish to a receiver.

Referring now to FIG. 6, a target fish F is illustrated in a body of water W having a bottom B which may be quite irregular and a top surfaces TS which may be irregular or smooth depending on surface conditions. The target fish or living source of biosound waves is at a variable distance R and variable depth below the surface relative to the receiver transducer assembly RTA. The direct path of biosound wave signals is indicated as PS and will produce the largest amplitude signal and will arrive at the receiver transducer assembly RTA first. The next signal is the bottom path signal for the path of the bio-soundwave and it traverses a path from the target fish is reflected off the bottom to the receiver transducer assembly RTA and this path is labeled B. The surface bottom path of a biosound wave which traverses from the target fish TF to the surface of the water TS down to the bottom B and thence to a receiver transducer assembly RTA is labeled SB as the surface bottom signal. The bottom to surface signal labeled BS in FIG. 6, traverses a path from the target fish TF to the bottom B is reflected off of the bottom towards the surface TS reflected off the surface TS to the receiver R. There is also of course, the signal emitted by the target fish TF and reflected directly from the water surface TS and received by the receiver transducer assembly RTA. If the target fish and the receiver are at about the same depth in the water, then this signal is almost the same as the direct path signal when the fish is near the surface.

Figure 7:
FIG. 7 is a time chart illustrating the relative times of reception of the sonic signal from the fish.

In the time chart shown in FIG. 7, the biosound wave signal labeled PS is the direct path biosound signal, the signal labeled B is the bottom path soundwave signal showing that it arrives at the receiver transducer assembly RTA at a time later than the direct path signal PS. The next group of biosound wave signals are labeled SB and it arrives at a later time than the bottom signal B than does the direct path signal PS. Further, the biosound wave signal labeled BS is at bottom surface signal which traverse the path from the target fish TF to the surface and then is reflected from the surface to the receiver.

It is known that the speed of sound in water at a temperature of 15 degrees C generally is about 4800 feet per second. This does not take into account the variations in speed due to temperature variations, salinity variations and different stratas, different kinds of sea water and variations going from one temperature stratum to another. It is generally accurate for purposes of this invention.

To determine the range from the receiver transducer assembly RTA to the target fish, the time difference of arrival of the bottom signal B and the bottom surface signal BS (B-BS) times 4800 equals the range in feet.

The depth of the target fish in the water can be determined by the time difference of the bottom signal B minus the surface bottom signal SB (B-SB) times 4800 feet per second.

It will be apparent that the invention can be practiced without doing the range computation discussed above.

These computations provide measures of distance to the fish and may be compared with the amplitude signals to validate or corroborate one another. It is apparent that because the bottom of the body of water may be irregular and have valleys and depressions therein that this could affect the time of arrival of the biosound signals at the receiver R. However, since the range determination is made by the difference in the bottom signal B minus the bottom surface signal BS, this factor is effectively eliminated.

These computations can be easily performed by the microprocessors (120, 52) so that the microprocessor can provide on the display 71 the range to the target, the direction and target type. The piezo-sounder 30 provides an aural or acoustic signal to the user that there is aquatic animals present. In the case of the embodiment of FIGS. 1, 2 and 3, the mechanical orientation of the transducer and the range display 31 provide directional information to the user of the angular direction to the target fish. In the embodiments of FIG. 4, which involve electronic scanning about a given axis of a plurality of transducers, the display of angular orientation or direction to the target fish is provided by a display 55. The actual passive range detection distance has not been determined but is believed to be several miles.

FIG. 8 is a block diagram and pictorial illustration of the invention incorporating passive aquatic animal detection, ranging and tracking, active sonar depth finding global position satellite finding and chart presentation. The scanning passive transducer system is indicated at 200 produces signals indicative the bearing, species, range and direction of movement of one or more aquatic animals, and supplies this data to a host microprocessor 210. A global position satellite receiver 20S receives satellite signals on its antenna (it could be a marine loran receiver) and supplies this data to microprocessor 210. Depth sounder 206 outputs its data to microprocessor 210 as well as a CD ROM reader 207. CD ROM reader 207 receives a CD disk 208 having a chart or map of the local area and presents a visual display of same on display 209.

The different data are superimposed on display 204 via microprocessor 210. The aquatic animal finder 200 plots fish 300 location and movement (arrow 301 is the plotted movement of the fish relative to the host vessel 302 and land mass 311). Range 304 to the fish can be provided by the aquatic animal finder and tracker 200, or by an active sonar unit. The location of the host vessel on the chart is provided by the GPS receiver 205. Fish species is provided by unit 200 in a "fish species" field 209. Land masses 311, island 312, buoy or marker 312, channel indicator 313 are provided by the CD ROM reader 207. The bottom profile and depth beneath host vessel 302 is provided by the active sonar 206, and depth readings may be compared with those on the chart from the CD ROM 207.

It will be understood that the above description of the present invention is capable of various modifications and adaptations and changes and that the same are intended to be encompassed within the meaning and spirit and range of equivalence of the appended claims.

What is claimed is:

1. In combination, passive transducer means adapted to be immersed in a body of water for converting biosound pressure waves from a source to electrical data signals, an ultrasonic echo sounding system having an active transducer for transmitting ultrasonic pulses in said body of water and receiving reflections of ultrasonic pulses, microprocessor controller means for controlling transmission and reception from said active transducer and determining the time interval between transmission and reception of said ultrasonic signals, means connecting said electrical data signals to said microprocessor means, said microprocessor means being adapted to detect predetermined patterns of said electrical data signals identifying the source of said biosound, and display means connected to said microprocessor means for displaying data derived from said active and passive transducers.

2. The invention defined in claim 1 including electronic position finding apparatus for receiving radio signals and producing an indication of the position of said electronic position finding apparatus, said display means being adapted to display (1) a map of the area surrounding said position finding apparatus, (2) the position of said electronic position finding apparatus thereon, and (3) the position of said source relative to said electronic position finding apparatus.

3. The invention defined in claim 2 including means for identifying the species of said biosound source and displaying said species on said display means.

4. In combination, an ultrasonic echo sounding system having an active transducer means for transmitting ultrasonic pulses in a body of water and receiving a reflected ultrasonic pulse, and microprocessor means controlling the transmission of said ultrasonic pulses and determining the time interval between transmission $T_T$ of said ultrasonic pulses and the receiving $T_R$ of said reflected ultrasonic pulse, passive transducer means for converting biosound waves from a living source traveling in said body of water to electrical data signals, filter means connected to said passive transducer means for passing only electrical data signals corresponding to said biosound waves, discriminator means connected to said filter means and said microprocessor and programmed to pass a predetermined pattern of said biosound data signals to said microprocessor, display means connected to said microprocessor means for displaying data derived from said active and passive transducer means.

5. In combination, aquatic animal finder apparatus including passive transducer means for converting biosounds from aquatic animals to electrical signals, electronic circuit means for processing said electrical signals and detect aquatic animals in a body of water and produce a first signal corresponding thereto, active sonar apparatus including an active transducer for transmitting ultrasonic pulses in said body of water and receiving reflections of said ultrasonic pulses, and producing a second signal corresponding thereto, logic means for receiving said first and second signals and producing an output signal only in the presence of said first signal.

6. The invention defined in claim 5 wherein said electronic circuit means includes means for detecting fish species.

7. The invention defined in claim 5 wherein said electronic circuit means includes means for detecting fish species, means for selecting a particular species of fish and causing said first signal to be specific to that fish even though there are other fish swimming in the area of the selected species.

* * * * *